Patented Jan. 19, 1932

1,841,910

UNITED STATES PATENT OFFICE

MATHIAS PIER, OF HEIDELBERG, AND RUDOLF WIETZEL AND KARL WINKLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCING OXYGENATED ORGANIC COMPOUNDS

No Drawing. Application filed February 6, 1925, Serial No. 7,391, and in Germany February 7, 1924.

It has been suggested elsewhere to produce methanol or other oxygenated organic compounds catalytically by the interaction of oxids of carbon and hydrogen, and it has been stated that the capacity of the contact masses for producing oxygenated compounds is strongly interfered with or even reduced to naught by the presence of iron in the said catalysts. Besides, it has been recommended to exclude iron or the compounds thereof, also from the gases which are to be brought into reaction and from the contact vessel and other parts of the apparatus.

We have now found that iron not only loses its injurious property for the production of oxygenated organic compounds, but actually exerts a high catalytic activity in the said direction, when according to our invention, the iron or its oxids are combined with another element or compound. Such combination must be stable under the conditions of working so as to prevent free iron metal being formed either by reduction or decomposition. It may be either a chemical, or a physical one. For example suitable catalysts containing iron, may consist of an oxid of iron or other compounds thereof in conjunction with a difficultly reducible oxygen compound for example an oxid of chromium, vanadium, tungsten zirconium, aluminium, titanium and others suitable to form compounds, or mixed crystals, with the said compounds of the metals of iron. Or the iron itself may be used in a state of an alloy or compound with one or more suitable elements such for example as manganese, chromium, tungsten, tin, zinc, silicon, boron, sulfur, phosphorus, arsenic or other metalloids other than carbon and the like. It is, however, necessary that such contact masses contain the iron saturated or even super-saturated with the dissolved or compounded element. For example, an iron alloy must consist of mixed crystals only with no free iron crystals. In accordance with our invention, the catalysts consisting of iron and a sufficient amount of sulfur, phosphorus, arsenic or other metalloids, except carbon, give rise to ample quantities of oxygenated organic compounds such as alcohols, ketones, acids, esters, and the like, whereas a catalyst containing free iron does not allow of organic compounds containing oxygen being produced in any substantial amount from mixtures of carbon oxid and hydrogen, but only methane and water and at the same time a deposit of carbon. The efficiency of the catalysts above-mentioned is further improved by the addition of an alkali or other alkali metal compounds. In many cases the nature of the products will be more or less different as compared with those produced with contact masses free from the said iron metals, for example higher alcohols, ketones, acids, and the like are formed in the present case in larger amounts.

Generally it is advisable in order to keep the said catalysts active for a long period of time, to cause them always to contain a certain amount of combined oxygen, and a small addition of oxygen may be made to the gases for this purpose, or part or even all of the hydrogen may be replaced by water vapor or steam. Hydrocarbons, for example methane, may also be present in addition to or instead of part or all of the hydrogen. Accordingly, water vapor, or steam, or hydrocarbons are equivalents of hydrogen for the purpose of the invention. With an increased percentage of carbon monoxid the formation of higher molecular products is generally increased and the formation of water lowered, whereas with a preponderating volume of hydrogen the relative production of methanol is increased. In the present case also, the gases to be subjected to the reaction must be free from iron carbonyl which would be decomposed by the contact masses and produce a coating thereon of free metallic iron which would give rise to undesirable reactions. Such an iron-coated contact mass would however be made effective again by binding the said free iron for example with sulfur or arsenic. Also care must be taken to avoid a formation of volatile compounds of the iron metals by a contact of the gases with surfaces of free iron metals, in the apparatus, by lining the latter with, or making it of, suitable non-ferrous metals, such as copper, aluminium, silver, manganese, chromium or others, or of suitable iron alloy, such as steel V2A of the firm of Krupp, or iron combined, or saturated, at least superficially, with sulfur, arsenic or other elements mentioned above, when however attention must be given to the fact that sulfur or some other elements would be extracted by the action of the reducing gases at high temperatures, say above about 400 degrees centigrade.

The process according to the present invention is preferably carried out at temperatures between 320° and 500° C. and at pressures between 200 and 800 atmospheres.

The following examples are given in order to illustrate the new process more fully, the parts being by weight unless otherwise stated.

*Example 1*

Ten parts of metallic iron are melted with ten parts of zinc, and twenty parts of tungstic acid introduced into the melt. With such catalyst a gas mixture containing 40 per cent of carbon monoxid and 60 per cent of hydrogen produces, at 200 atmospheres and 460 degrees centigrade, a mixture of methyl alcohol and higher molecular, oxygenated organic compounds.

*Example 2*

Ferric hydroxid is kneaded with ten per cent its weight chromium hydroxid, dried and reduced to grains. The mass is then soaked with a solution of 40 per cent its weight zinc nitrate and 40 per cent its weight potassium permanganate. A gas mixture composed of coal gas and carbon monoxid is first passed over a methane forming catalyst at a temperature of about 500 degrees centigrade and a pressure of 800 atmospheres; the gas mixture produced containing about 30 per cent carbon monoxid, 30 per cent methane, 30 per cent hydrogen and 10 per cent nitrogen, carbon dioxid and other gases is then passed at said pressure and at a temperature of 380 degrees centigrade over the aforedescribed catalytic mass whereby a mixture of methanol, ethyl alcohol, propyl alcohol, acetone, acids and so on is produced. A contact mass composed of iron, manganese and arsenic acts in a similar manner.

*Example 3*

A contact mass containing 60 parts of zinc oxid and 30 parts of chromium oxid which is very suitable for producing methanol from carbon monoxid and hydrogen, is greatly injured by an addition of 10 parts of free iron oxid. It would yield practically exclusively water and hydrocarbons while a heavy deposition of carbon takes place. If, however, 5 parts of sulfur are further added to the mass, it produces, when a mixture of carbon monoxid and hydrogen is passed over it, at 400 degrees centigrade and 200 atmospheres, ample quantities of methanol and higher molecular products. A similar action is exerted by other metalloids such for example as tellurium, phosphorus, arsenic, or other metalloids related thereto, such as tin, antimony, bismuth or the like.

*Example 4*

Manganese steel is dissolved in an acid, the solution evaporated to dryness and the residue mixed with a solution of 20 per cent its weight vanadic acid and 20 per cent its weight chromic acid. The mass is dried at 120 degrees centigrade, and when a mixture of 20 per cent of carbon dioxid and 80 per cent of hydrogen is passed over this catalyst at 200 atmospheres and 350 degrees centigrade, the formation of oxygenated organic compounds takes place.

*Example 5*

100 parts of zinc oxid are soaked in the succession mentioned with solutions of 10 parts of chromic acid, 10 parts of ferric nitrate, 10 parts of potassium carbonate and 5 parts of arsenic pentoxid, and dried at 150 degrees centigrade. A gas mixture composed of 60 per cent carbon monoxid and 40 per cent of hydrogen, completely dry and free from iron carbonyl, when passed over the said mass at 350 degrees centigrade and 200 atmospheres gives rise to a product composed of methyl alcohol and small amounts of ethyl-, propyl-, isobutyl- and other alcohols and acids for example formic and acetic acid.

We do not confine ourselves to the particulars given in the above examples which are merely typical and can be varied within wide limits without departing from the scope of our invention.

We claim:

1. The process of converting oxides of carbon into oxygenated organic compounds by means of hydrogen and a contact mass which comprises acting on a mixture containing oxides of carbon and hydrogen at a pressure between 200 and 800 atmospheres and a temperature between 320 and 500° C. with a catalytic mass comprising iron in a combined condition and a difficultly reducible oxide.

2. The process of producing oxygenated organic compounds which comprises exposing at a pressure between 200 and 800 atmospheres and at a temperature between 320° and 500° C. a mixture of an oxid of carbon and hydrogen, to the action of a catalytic mass comprising iron in a combined condition and a difficultly reducible solid oxid.

3. The process of producing oxygenated organic compounds which comprises exposing at a pressure between 200 and 800 atmospheres and at a temperature between 320° and 500° C. a mixture of an oxid of carbon and hydrogen, carefully freed from volatile compounds of iron metals and in the absence of free iron metals in the surfaces of the apparatus exposed to the said gases, to the action of a catalytic mass comprising iron in a combined condition and a difficultly reducible solid oxid.

4. The process of producing oxygenated organic compounds which comprises exposing at a pressure between 200 and 800 atmospheres and at a temperature between 320° and 500° C. a mixture of an oxid of carbon and hydrogen, carefully freed from volatile compounds of iron metals and in the absence of free iron metals in the surfaces of the apparatus exposed to the said gases, to the action of a catalytic mass comprising iron and a difficultly reducible solid oxid and an addition of an alkali metal compound.

5. The process of producing oxygenated organic compounds which comprises exposing, at a pressure between 200 and 800 atmospheres and a temperature between 320 and 500° C., a mixture of an oxide or carbon, hydrogen and water vapor to the action of a catalytic mass comprising iron in a combined condition and a difficultly reducible solid oxide.

6. The process of converting oxids of carbon into oxygenated organic compounds by means of hydrogen and a contact mass which comprises acting on a mixture containing an oxid of carbon and hydrogen, at a pressure between 200 and 800 atmospheres and at a temperature between 320 and 500° C. with an alloy of iron and a metal selected from the group consisting of manganese, chromium, tungsten, tin and zinc.

7. The process of converting oxides of carbon into oxygenated organic compounds by means of hydrogen and a contact mass which comprises acting on a mixture containing an oxide of carbon and hydrogen, at a pressure between 200 and 800 atmospheres and at a temperature between 320 and 500° C., with a catalytic mass comprising between about 25 and 50 per cent of iron in a combined condition and a sufficient amount of a difficulty reducible solid oxide.

8. The process of producing oxygenated organic compounds which comprises exposing at a pressure between 200 and 800 atmospheres and at a temperature between 320 and 500° C. a mixture of an oxide of carbon and hydrogen, to the action of a catalytic mass comprising between about 25 and 50 per cent of iron in a combined state and a sufficient amount of a difficulty reducible solid oxide.

9. The process of producing oxygenated organic compounds which comprises exposing at a pressure between 200 and 800 atmospheres and at a temperature between 320 and 500° C. a mixture of an oxide of carbon and hydrogen, carefully freed from volatile compounds of iron metals and in the absence of free iron metals in the surfaces of the apparatus exposed to the said gases, to the action of a catalytic mass comprising between about 25 and 50 per cent of iron in a combined state and a sufficient amount of difficulty reducible solid oxide.

10. The process of producing oxygenated organic compounds which comprises exposing at a pressure between 200 and 800 atmospheres and at a temperature between 320 and 500° C. a mixture of an oxide of carbon and hydrogen, carefully freed from volatile compounds of iron metals and in the absence of free iron metals in the surfaces of the apparatus exposed to the said gases, to the action of a catalytic mass comprising between about 25 and 50 per cent of iron in a combined condition and a sufficient amount of a difficulty reducible solid oxide and an addition of an alkali metal compound.

11. The process of producing oxygenated organic compounds which comprises exposing at a pressure between 200 and 800 atmospheres and at a temperature between 320 and 500° C. a mixture of an oxide of carbon, hydrogen and water vapour to the action of a catalytic mass comprising between 25 and 50 per cent of iron in a combined condition and a sufficient amount of a difficulty reducible solid oxide.

12. The process of producing oxygenated organic compounds which comprises exposing at a pressure between 200 and 800 atmospheres and at a temperature between 320 and 500° C. a mixture of an oxide of carbon, hydrogen, water vapour and a hydrocarbon to the action of a catalytic mass comprising between about 25 and 50 per cent of iron in a combined condition and a metal oxide that is difficulty reducible under the conditions of working.

13. The process of converting oxides of carbon into oxygenated organic compounds by means of hydrogen and a contact mass which comprises acting on a mixture containing an oxide of carbon and hydrogen, at a pressure between 200 and 800 atmospheres and at a temperature between 320 and 500° C., with a catalytic mass comprising between 25 and 50 per cent of iron in a combined condition and a metal oxide that is difficulty reducible under the conditions of working.

In testimony whereof we have hereunto set our hands.

MATHIAS PIER.
RUDOLF WIETZEL.
KARL WINKLER.